Figure 1:
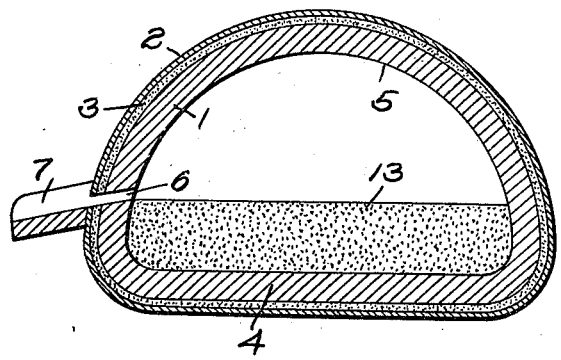

Mar. 13, 1923.

J. P. SNEDDON.
FURNACE.
FILED NOV. 4, 1921.

1,448,163.

2 SHEETS—SHEET 1.

INVENTOR
James Stuart Sneddon
and
Edward R. Stettinius
Executors of
James P. Sneddon, deceased.
By Winter & Brown
attys.

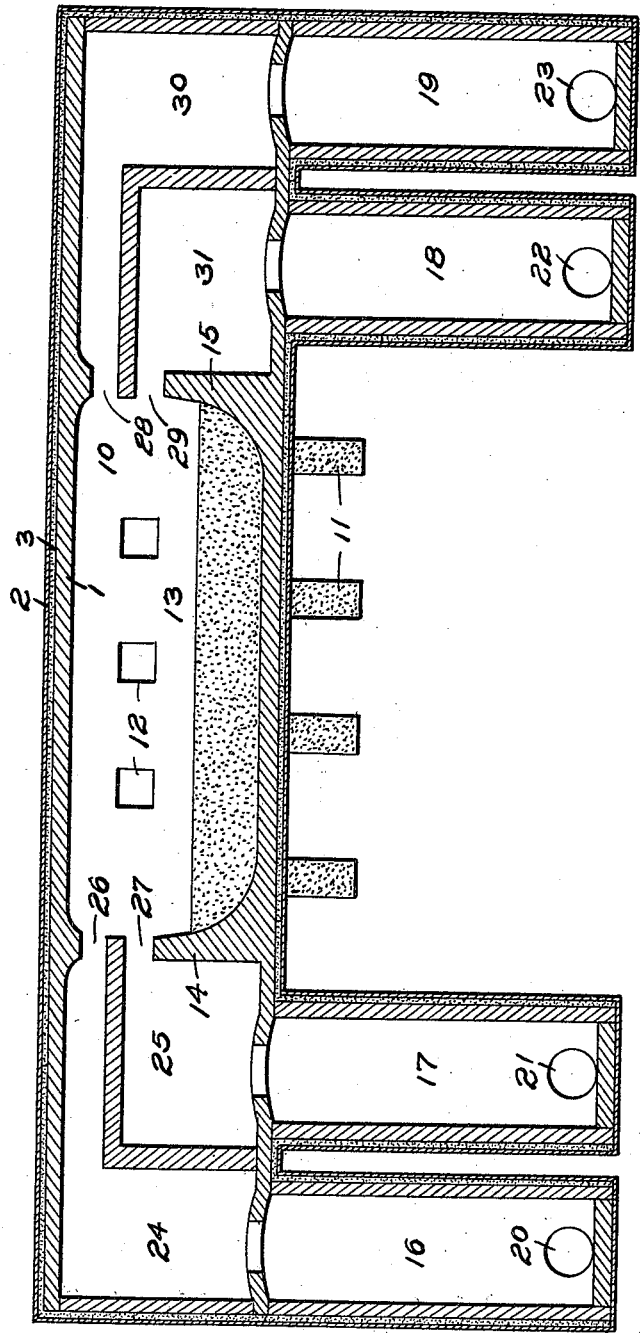

Patented Mar. 13, 1923.

1,448,163

UNITED STATES PATENT OFFICE.

JAMES P. SNEDDON, DECEASED, LATE OF BAYONNE, NEW JERSEY, BY JAMES STUART SNEDDON, OF BAYONNE, NEW JERSEY, AND EDWARD R. STETTINIUS, OF NEW YORK, N. Y., EXECUTORS, ASSIGNORS TO PITTSBURGH SEAMLESS TUBE COMPANY, OF BEAVER FALLS, PENNSYLVANIA, A CORPORATION OF PENNSYLVANIA.

FURNACE.

Application filed November 4, 1921. Serial No. 512,953.

*To all whom it may concern:*

Be it known that JAMES P. SNEDDON, deceased, late a citizen of the United States, resident of Bayonne, in the county of Hudson and State of New Jersey, has invented a new and useful Furnace, of which the following is a specification.

The invention relates to stationary horizontal or approximately horizontal industrial furnaces and ovens of various kinds, such as annealing furnaces for steel products, metal heating furnaces for forging, rolling and tube mill work, metal refining furnaces, reverberatory furnaces, open hearth furnaces, roasting furnaces, malleable iron furnaces, soaking pit furnaces, glass melting tanks, glass annealing furnaces, by-product coke furnaces, and other similar industrial heating furnaces or ovens which ordinarily are built of refractory brick or blocks to provide a heating chamber comprising a hearth or floor, side walls, and a roof or crown.

Heretofore, furnaces and ovens of the character described have been of substantially rectangular cross-section, built of refractory brick or blocks and comprising vertical side walls and an arched crown or roof sprung between or on top of the side walls, and of such size that the resulting stresses required that their walls be thick and held together by various arrangements of buck stays and tie bolts, skew-backs, or suspended metallic arch hangers or supports. When such furnaces or ovens, built according to the usual practice, are fired or heated up, the refractory lining expands, the joints open up and the bricks crack, thus exposing larger areas of the refractory brick or blocks for the absorption of heat, with the result that the refractory lining disintegrates or burns out, the roof or crown rapidly weakens and collapses, and the side walls become cracked and open at the joints with a resultant large loss or dissipation of heat. Furthermore the expansion of the refractory lining makes it necessary to loosen the tie rods in order to prevent the buck stays or tie rods from breaking or the wall from collapsing. Furthermore this prior construction requires such thickness of wall and roof or crown and such heavy and strong buck stays, tie rods, and the like, in order to secure reasonable strength and durability, that the cost of construction is correspondingly high, and this together with the short life of furnaces so constructed renders them expensive. The opening up of the seams in the wall and the cracking and dropping out of the brick also renders such furnaces uneconomical in operation due to the large dissipation of heat.

In an application filed November 4, 1921, Serial No. 512,950 (Case A) I have illustrated and described a construction of furnaces and ovens of the kind and for the purposes named whose initial cost is considerably less than that of present designs of such furnaces and ovens but whose durability or life nevertheless is much longer, which are so constructed as to automatically take care of the expansion and construction of the walls which occur when the furnaces are being heated up or cooled down, and in which the loss of heat by radiation is reduced, thereby effecting economy in the consumption of fuel,—said furnaces or ovens comprising a stable structure formed by walls which, in lieu of being rectangular in cross section, are in the form of a circle, ellipse, or other continuous-curve form approximately a circle or ellipse, and consisting of a continuous inner wall built up of refractory brick or blocks and being under compression, and an outer continuous-curve sheet metal casing or shell surrounding the compression wall and forming a tension member which resists radial and tangential stresses due to the expansion of the compression wall, said stable structure being such as to automatically take care of the expansions and contractions which occur when the furnace is being heated up or cooled down.

The invention of the present application relates to a modified form of the furnace constructions illustrated and described in the application above identified, but with the same general objects in view, and with the realization of the same general results. Generally stated the invention consists in the provision of a substantially horizontal stationary furnace having a flat bottom or hearth of such proportions as to withstand the strains to which it is subjected, and a roof or crown of continuous-curve in cross section, the furnace wall comprising a continuous inner wall of refractory material under compression, and an outer sheet metal casing or shell surrounding the compression wall and forming a tension member, the whole forming a stable structure which overcomes the difficulties above noted.

The invention is applicable to all furnaces and ovens of the character specified, whether of the direct heating, semi-muffled, or muffled type.

Figure 2:
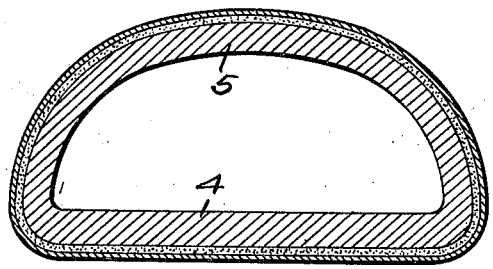

In the accompanying drawings, Fig. 1 is a transverse section through the body of the furnace shown in Fig. 3 and having a semi-circular roof or crown; Fig. 2 a view similar to Fig. 1 in which the roof is in the form of a flattened arc of a circle; and Fig. 3 is a longitudinal sectional view through an open hearth furnace embodying the invention.

In each of the forms illustrated, 1 designates an inner wall built up of refractory material, preferably refractory brick or blocks, and comprising a compression wall encased in an outer sheet metal casing or shell 2 forming a tension member resisting radial and tangential stresses. Between the compression wall 1 and the tension member 2 is an intermediate compressible lining 3, preferably formed of a material such as magnesia which will not only act as a compressible lining but will also function as a heat insulating medium to prevent dissipation of heat.

Each of the forms shown comprises a heavy flat hearth portion 4 and an upper curved roof portion 5, the difference between the two forms being merely in the curvature of the roof or crown, that in Fig. 1 being semi-circular while that in Fig. 2 is in the form of a flattened arc of a circle.

In each of the forms, the outer shell 2 acting as a tension member cooperates with the inner refractory compression wall 1 to form a stable structure. Whenever the furnace is heated up, wall 1 expands putting the intermediate lining 3 under greater compression which, in turn, is resisted by the tension member 2. It has been found that various materials adapted to be used for the refractory lining have varying coefficients of expansion and that some even possess a negative coefficient of expansion after reaching predetermined temperatures. The use of the intermediate compressible lining 3 compensates for all these various degrees and ratios of compression keeping the inner wall and shell in intimate contact, and assures the body constituted by the wall 1, lining 3 and tension member 2, being maintained stable at all times, regardless of the degree to which the furnace is heated and whether the same is being heated up or cooled down. Besides functioning as a means to compensate for various degrees of expansion and to maintain a stable structure, the lining 3 also functions as a means to prevent the dissipation of heat. It is to be understood that the intermediate lining 3 is only one means of compensation which may be effected by various alternatives, the invention broadly contemplating a construction comprising an inner compression wall an outer tension member and compensation means, all of which cooperate to form a stable structure as described. The section illustrated in Fig. 1 is taken through the tap hole and discharge spout, the former being designated 6 and the latter indicated at 7.

In the form shown in Fig. 2 considerable radial and tangential stresses are produced, not only by expansion of the compression wall, but also due to the fact that the roof 5 is in the form of a flattened arc of a circle. In any case, however, the construction defined assures the stability of the structure being maintained.

The invention defined is applicable to various kinds of furnaces, as above noted, the drawings showing its embodiment in an open hearth furnace. As shown, the same comprises the longitudinal body portion 10 supported as indicated at 11 and provided with the charging openings 12. The hearth 13 is built upon the floor or hearth portion of the body 10 between the upright walls 14 and 15. Located at the opposite ends of the furnace beneath the same are the regenerator chambers 16, 17, 18 and 19, each being provided with an opening at its lower part as indicated at 20, 21, 22 and 23 respectively, for the admission of air and gas. The outer chambers 16 and 19 are for air and the inner chambers 17 and 18 are for gas. The air and gas from the regenerators 16 and 17 pass upwardly through openings at their top into the chambers 24 and 25 and escape into one side of the furnace through ports 26 and 27 while the hot fumes escape at the opposite side through ports 28, 29, chambers 30, 31, regenerators 18, 19 and openings 22, 23 into the stack. Reversing valves and control valves, not shown, are provided in passages connecting the regenerators so that the flow through the opposite pairs may be reversed at predetermined intervals in the well known manner customary in this type of furnace.

The advantages of the invention are the prevention of disintegration and burning out of the refractory wall, reduction in the quantity of material required in original construction with corresponding decrease in the cost of material and labor for installation, decreased cost of repair and replacement, the elimination of the usual expensive skewbacks and buck stays, together with their disadvantages, increased comfort and economy due to the confinement of the heat, increased life of the furnace, and reduction in the weight of the furnace permitting the use of lighter and spaced apart foundations for supporting the same.

We claim:

1. A stationary substantially horizontal furnace or oven forming a stable continuous body and constituting a lower substantially flat portion and an upper curved top portion, both of said portions consisting of an inner wall of refractory material as a compression member, and an outer metal shell surrounding the compression member and forming a tension member for constantly maintaining the same under compression and resisting outward thrusts due to the cross sectional shape of the furnace and stresses thereof due to expansion.

2. A stationary substantially horizontal furnace or oven forming a stable continuous body and constituting a lower substantially flat portion and an upper portion in the form of a flattened arc of a circle constantly producing lateral thrusts, both of said portions consisting of an inner wall of refractory material as a compression member and an outer metal shell surrounding the compression member and forming a tension member for maintaining the same under compression and resisting said lateral thrusts and the outward stresses due to expansion thereof.

3. A stationary substantially horizontal furnace or oven forming a stable continuous body and constituting a lower substantially flat portion and an upper curved top portion which is non-circular constantly producing lateral stresses, both of said portions consisting of an inner wall of refractory material as a compression member and an outer metal shell surrounding the compression member and forming a tension member for maintaining the same under compression and resisting outward stresses due to the cross sectional shape of the furnace and to expansion thereof.

In testimony whereof, we sign our names.

JAMES STUART SNEDDON,
EDWARD R. STETTINIUS.
*Executors of James P. Sneddon, deceased.*